United States Patent [19]

Huang

[11] Patent Number: 5,785,607
[45] Date of Patent: Jul. 28, 1998

[54] SPIRAL CUT SLEEVE-TYPE GOLF CLUB GRIP

[76] Inventor: Ben Huang, 19472 Woodlands La., Huntington Beach, Calif. 92648

[21] Appl. No.: 687,244

[22] Filed: Jul. 25, 1996

Related U.S. Application Data

[63] Continuation-in-part of Ser. No. 637,931, Jan. 14, 1991, abandoned, Ser. No. 890,383, May 26, 1992, abandoned, Ser. No. 953,190, Sep. 29, 1992, Ser. No. 58,313, May 3, 1993, Ser. No. 542,009, Nov. 13, 1995, Pat. No. 5,645,501, Ser. No. 567,339, Dec. 28, 1995, abandoned, Ser. No. 595,445, Feb. 26, 1996, and Ser. No. 656,942, Jun. 14, 1996.

[51] Int. Cl.⁶ ............................................. A63B 49/08
[52] U.S. Cl. ........................... 473/301; 473/549; 473/568
[58] Field of Search .............................. 473/300, 301, 473/302, 549, 550, 551, 568

[56] References Cited

U.S. PATENT DOCUMENTS

| | | |
|---|---|---|
| 1,139,843 | 5/1915 | Brown . |
| 1,447,989 | 3/1923 | Kinsman . |
| 1,556,781 | 10/1925 | Gjorup . |
| 1,701,856 | 2/1929 | Kraeuter . |
| 1,940,104 | 12/1933 | Russell et al. ........................ 273/81 |
| 1,943,399 | 1/1934 | Smith ................................... 273/81 |
| 2,003,917 | 6/1935 | Bowden ................................. 273/75 |
| 2,046,164 | 6/1936 | Herkner ................................. 273/81 |
| 2,086,062 | 7/1937 | Bray .................................... 273/81 |
| 2,166,044 | 7/1939 | Fletcher ................................ 273/75 |
| 2,166,045 | 7/1939 | Fletcher ................................ 273/75 |
| 2,513,655 | 7/1950 | Lamkin et al. ......................... 273/81 |
| 2,659,605 | 11/1953 | LeTourneau . |
| 2,737,503 | 3/1956 | Sprague et al. . |
| 3,582,456 | 6/1971 | Stolki ................................ 161/165 |
| 3,654,066 | 4/1972 | Fukushima et al. .................. 161/160 |
| 3,845,954 | 11/1974 | Case ................................... 273/75 |
| 3,848,480 | 11/1974 | Oseroff et al. ..................... 74/558.5 |
| 3,848,871 | 11/1974 | Sweet et al. .......................... 273/75 |
| 3,860,469 | 1/1975 | Gregorian et al. ................... 156/83 |
| 3,881,521 | 5/1975 | Johansen et al. .................... 138/126 |
| 3,899,172 | 8/1975 | Vaughn et al. ........................ 273/73 |
| 4,015,851 | 4/1977 | Pennell ................................ 273/75 |
| 4,044,625 | 8/1977 | D'Haem ............................. 74/558.5 |
| 4,070,020 | 1/1978 | Dano .................................. 273/73 |
| 4,100,006 | 7/1978 | Buckley ............................... 156/78 |
| 4,133,529 | 1/1979 | Gambino . |
| 4,159,115 | 6/1979 | Tickin et al. . |
| 4,174,109 | 11/1979 | Gaiser .............................. 273/81.6 |
| 4,284,275 | 8/1981 | Fletcher ............................... 273/75 |
| 4,347,280 | 8/1982 | Lau et al. .......................... 428/304.4 |
| 4,454,187 | 6/1984 | Flowers et al. ...................... 428/159 |
| 4,567,091 | 1/1986 | Spector ............................... 428/222 |
| 4,647,326 | 3/1987 | Pott ................................... 156/77 |
| 4,660,832 | 4/1987 | Shomo ................................. 273/73 |
| 4,662,415 | 5/1987 | Proutt ................................. 150/52 |
| 4,736,949 | 4/1988 | Muroi .................................. 273/73 |
| 4,765,856 | 8/1988 | Doubt ................................ 156/212 |
| 4,853,054 | 8/1989 | Turner et al. ......................... 156/78 |
| 4,934,024 | 6/1990 | Sexton, I ............................. 16/111 |
| 5,042,804 | 8/1991 | Uke .................................... 273/75 |
| 5,110,653 | 5/1992 | Landi ................................. 428/116 |
| 5,274,846 | 1/1994 | Kolsky . |
| 5,275,407 | 1/1994 | Soong .................................. 273/73 |

FOREIGN PATENT DOCUMENTS

| | | |
|---|---|---|
| 2398099 | 7/1977 | France . |
| 2805314 | 8/1979 | Germany . |
| 3414978 | 10/1985 | Germany . |
| 458367 | 6/1935 | United Kingdom . |
| 443228 | 2/1936 | United Kingdom . |
| 870021 | 6/1961 | United Kingdom . |
| 979242 | 1/1965 | United Kingdom . |

*Primary Examiner*—William M. Pierce
*Attorney, Agent, or Firm*—Fulwider Patton Lee & Utecht, LLP

[57] ABSTRACT

A golf club grip having a spirally-cut resilient underlisting sleeve which is spirally wrapped about the grip-receiving portion of a golf club shaft, and an elongated felt and polyurethane strip which is spirally wrapped and adhered onto the exterior of the shaft-mounted sleeve.

12 Claims, 5 Drawing Sheets

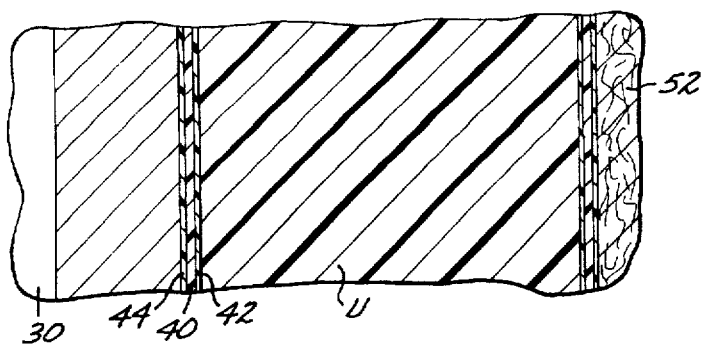
FIG. 3
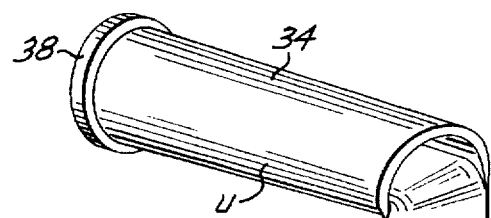
FIG. 4
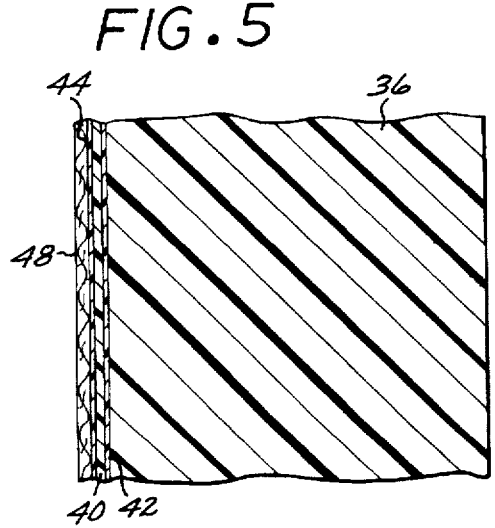
FIG. 5
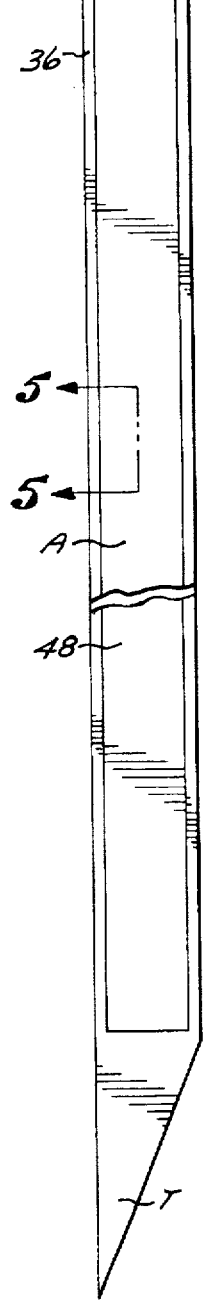

FIG.6
FIG.7
FIG.8
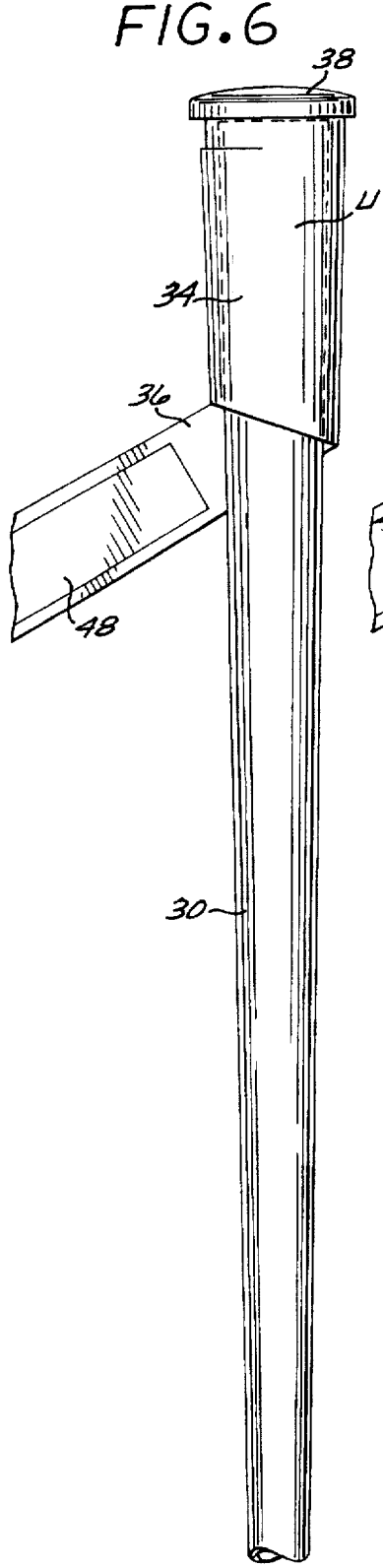
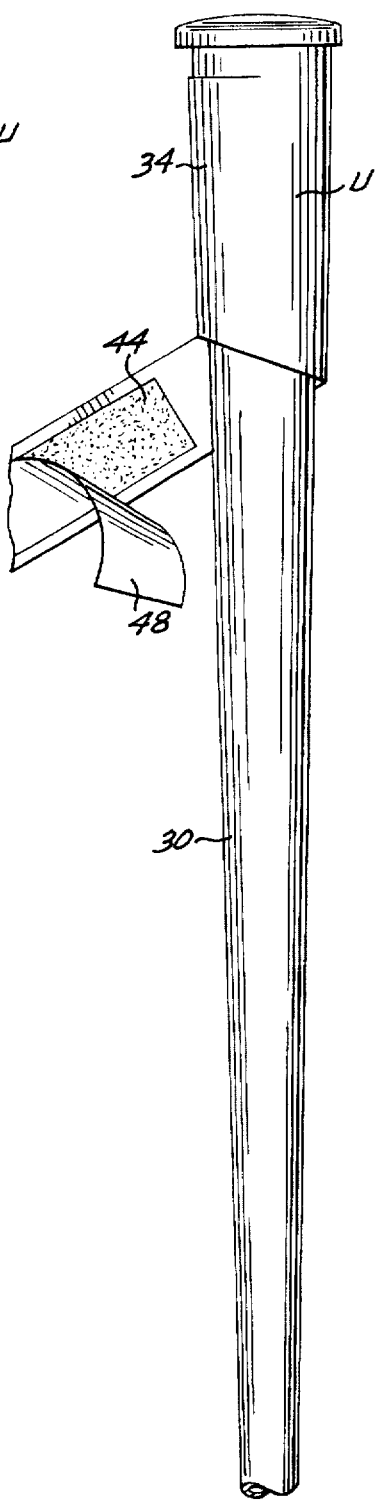
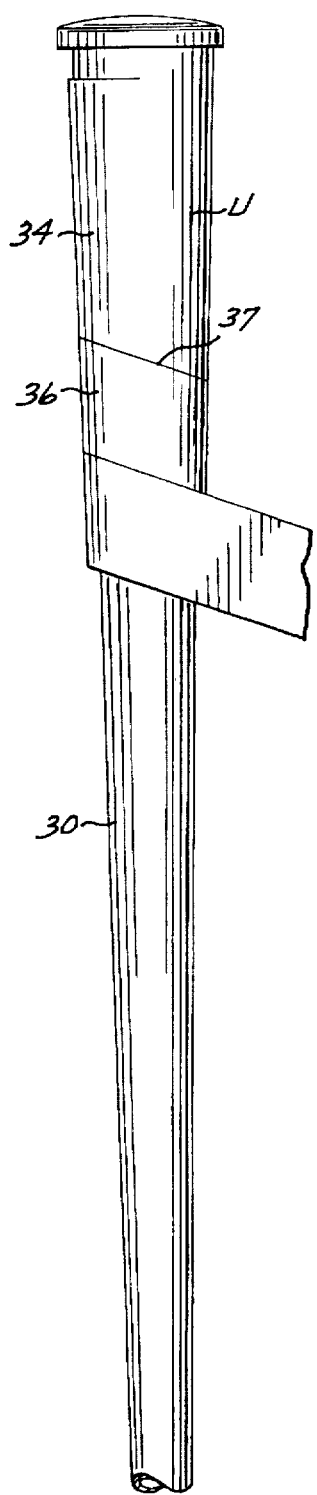

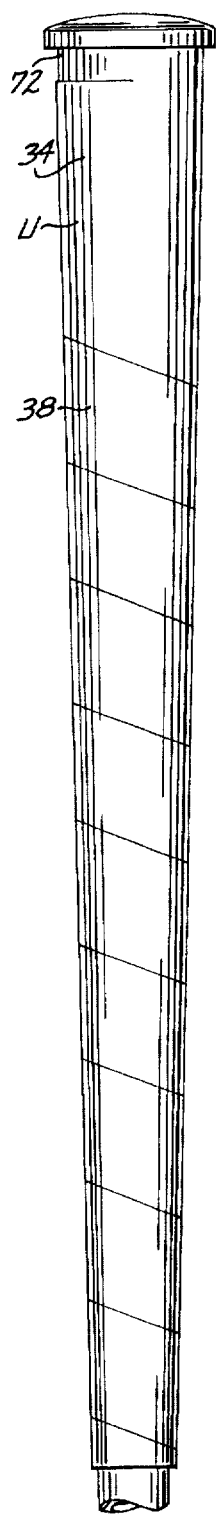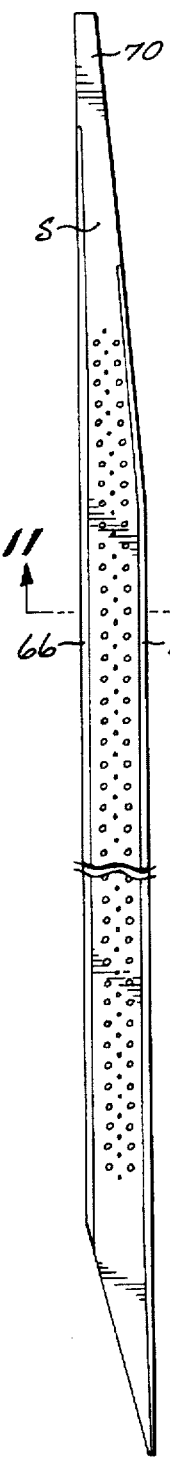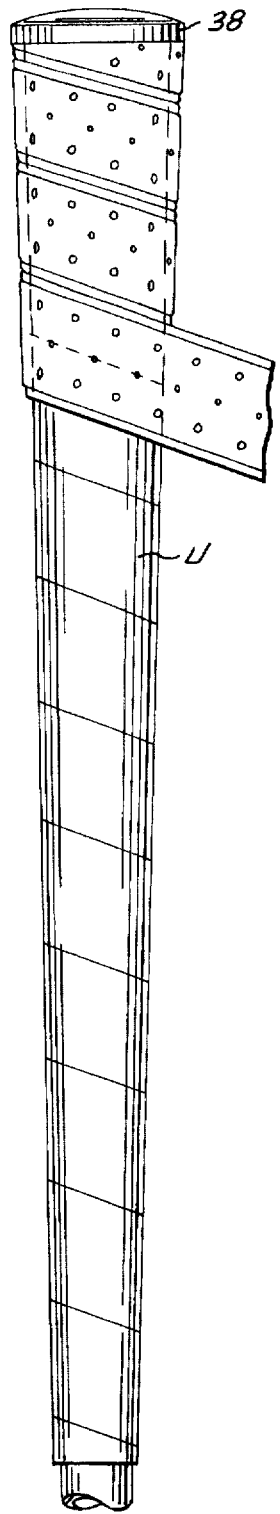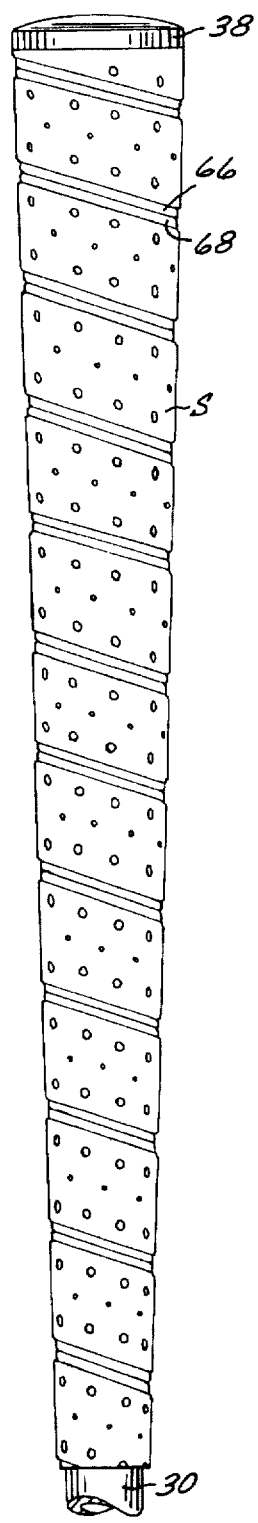

FIG. 14
FIG. 15
FIG. 16
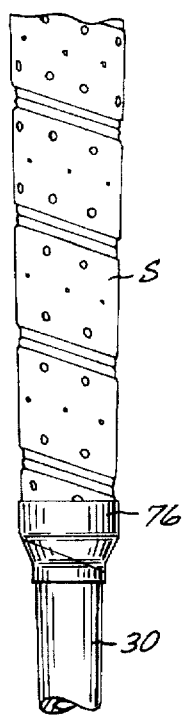
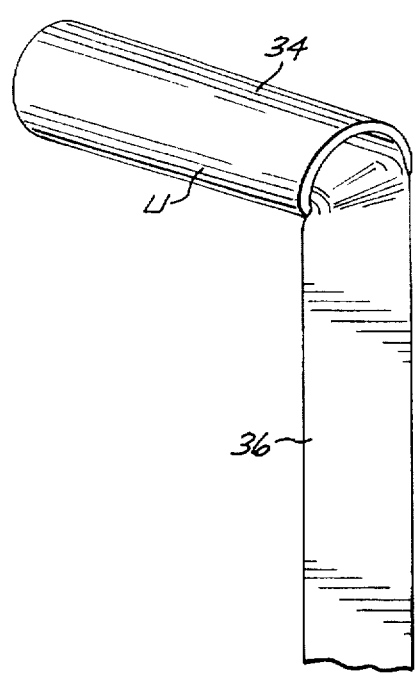
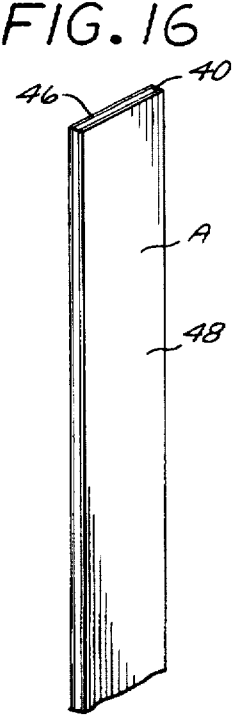
FIG. 17
FIG. 18
FIG. 19
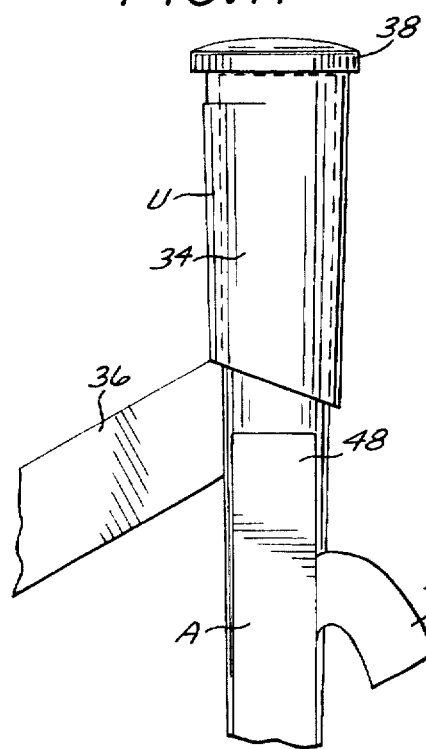
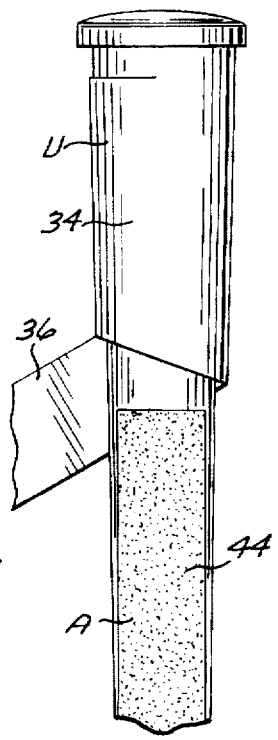
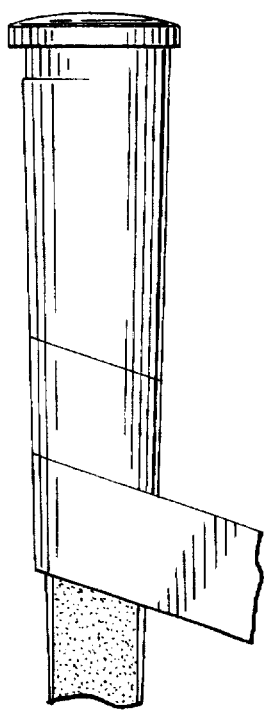

5,785,607

1

SPIRAL CUT SLEEVE-TYPE GOLF CLUB GRIP

This is a continuation-in-part of application(s) U.S. Ser. No. 07/637,931 filed on Jan. 14, 1991 (now abandoned), U.S. Ser. No. 07/890,383 filed on May 26, 1992 (now abandoned), U.S. Ser. No. 07/953,190 filed on Sep. 29, 1992, U.S. Ser. No. 08/058,313 filed on May 03, 1993, U.S. Ser. No. 08/542,009 filed on Nov. 13, 1995, U.S. Pat. No. 5,645,501 (now abandoned), U.S. Ser. No. 08/567,339 filed on Dec. 28, 1995, U.S. Ser. No. 08/595,445 filed on Feb. 26, 1996, U.S. Ser. No. 08/656,942 filed on Jun. 14, 1996.

BACKGROUND OF THE INVENTION

1. Field of the Invention

The present invention relates to handle grips and more particularly to an improved golf club grip.

2. Description of the Prior Art

Applicant has previously developed an improved golf club grip designed to solve the problems inherent to conventional golf club grips. Conventional golf club grips are molded from a single piece of rubber or synthetic plastic. When it is necessary to replace the original grip, such replacement is difficult and cannot be accomplished by the average golfer. Accordingly, the golfer is required to leave his golf clubs at a golf shop for several days for application of the replacement grip. Another disadvantage of conventional golf club grips is their tendency to become slippery when dampened, as for example, when playing under rainy conditions or by contact with perspiration formed on a golfer's hands. Slippery contact of a golfer's hands with a golf club grip reduces his feel of the golf club. Conventional golf club grips are generally made of a hard material which fails to provide adequate shock absorbing qualities.

Applicant has previously developed an improved golf club grip designed to solve the above set forth problems inherent to conventional golf club grips. See, for example, applicant's U.S. patent application Ser. No. 08/507,575, filed Jul. 26, 1995 now U.S. Pat. No. 5,584,482. Such grip utilizes a resilient sleeve that is formed with a longitudinal split which is opened along the slit to position the sleeve on the upper portion of a golf club shaft. The sleeve is then adhered to the upper portion of the golf club shaft. An elongated resilient strip is spirally wrapped about the outer surface of the sleeve to define the golf club grip. The elongated strip includes a porous felt layer having an inner surface abutting the sleeve and a closed-pore polyurethane layer having its inner surface bonded to the outer surface of the felt layer remote from the sleeve, with the pores of the polyurethane layer extending generally normal to the longitudinal axis of the sleeve. A suitable strip of this type is described in my aforementioned patent application.

Such split-sleeve grip affords very satisfactory results, however, where the sleeve is applied to an oversize shaft, the side edges of the split may not come into abutment resulting in a gap between such edges. Some golfers who replace their own golf club grips, complain about such gap. Also, it may be possible to feel the gap when the elongated strip is spirally wrapped about the sleeve. If the split sleeve is applied to a smaller outside diameter golf club shaft, e.g. a ladies golf club, the side edges of the split sleeve may slightly overlap causing the sleeve to be out of round.

SUMMARY OF THE INVENTION

The grip of applicant's present invention eliminates the aforementioned gap problems by forming a major portion of

2 the sleeve with a spiral cut so that when the sleeve is positioned on a golf club shaft, such major portion is spirally wrapped about the golf club shaft with the edges of the adjoining portions of the sleeve in tight abutment. Thereafter, a felt and polyurethane strip of the aforedescribed is then spirally wrapped about and adhered to the exterior surface of the sleeve. This arrangement completely eliminates the aforedescribed gap problems of my longitudinally split-type sleeve.

These and other features and advantages of the present invention will become apparent from the following detailed description, when taken in conjunction with the accompanying drawings.

FIG. 3 is a vertical sectional view in further enlarged scale of the encircled area designated 3 in FIG. 2;

FIG. 4 is a perspective view of a spirally cut sleeve member of the grip embodying the present invention;

FIG. 5 is vertical sectional view taken in enlarged scale taken along line 5—5 of FIG. 4;

FIGS. 6–9 are broken side elevational views showing the sleeve of FIG. 4 being applied to the grip-receiving portion of a golf club shaft;

FIG. 10 is a plan view in reduced scale of a felt-polyurethane strip member of a grip embodying the present invention;

FIG. 11 is a vertical sectional view taken in enlarged scale along line 11—11 of FIG. 10;

FIGS. 12 and 13 are broken side elevational view showing the strip member of FIG. 10 being spirally wrapped over the sleeve member of the grip of the present invention;

FIG. 14 is a broken side elevational view showing a grip embodying the present invention applied to a golf club shaft;

FIG. 15 is a broken perspective view showing the spirally cut sleeve of FIG. 4 without the adhesive carrier of FIG. 16;

Figure 1:
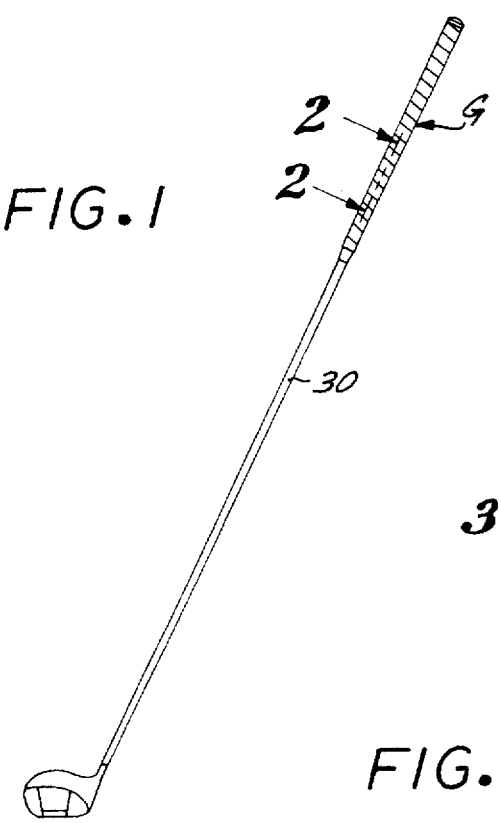
FIG. 1 is a perspective view showing a golf club provided with a golf club grip embodying my present invention.

10 FIG. 16 is a broken perspective view showing an adhesive carrier utilized to adhere the spirally cut sleeve to a golf club shaft; and FIGS. 17–19 are side broken elevational views showing the sleeve of FIG. 15 being applied to the grip-receiving portion of a golf club shaft.

Referring to the drawings, there is shown a grip G applied to the grip-receiving portion of the shaft 30 of a golf club. Grip G includes a resilient spirally cut sleeve or underlisting member U which abuts and is adhered to golf club shaft 30, and over which is spirally wrapped a felt-polyurethane strip member S.

More particularly, resilient spirally cut sleeve U may be of unitary synthetic plastic foam or rubber construction. Such sleeve includes a cylindrical butt portion 34 from which depends an integral main portion 36. Butt portion 34 is formed with an integral cap 38 which abuts the upper end of golf club shaft 30. The inner diameter of the cylindrical butt portion 34 should be so selected as to affect a snug fit with the upper portion golf club shaft 30 when telescopically applied thereto as shown in FIG. 7. The lower end of main portion 36 is formed with a triangular tongue T. An adhesive carrier C shown particularly in FIG. 16 is utilized to attach sleeve U to the golf club shaft 30. Such adhesive carrier A includes a flexible plastic body 40 coated on its inner surface with a first adhesive 42 and on its outer surface with a second adhesive 44. Protective tapes 46 and 48 initially cover the adhesives. The adhesive carrier A extends along the length of main portion 36. A grip embodying the present invention may be sold with the first adhesive 42 attaching the plastic body 40 to the main sleeve portion 36, as shown in FIG. 5.

Referring now to FIGS. 6–9, to apply the spirally cut sleeve U to the grip-receiving portion of golf club shaft 30, the cylindrical butt member 34 is slipped over the upper end of the golf club shaft to telescopically interfit therewith. Thereafter, as shown in FIG. 7, protective tape 48 is peeled off second adhesive 44 and the main portion 36 is spirally wrapped about the golf club shaft with the side edges thereof in tight abutment, as indicated at 37 in FIG. 8, until the entire length of the elongated base portion has been wrapped about the shaft, as shown in FIG. 9.

Figure 2:
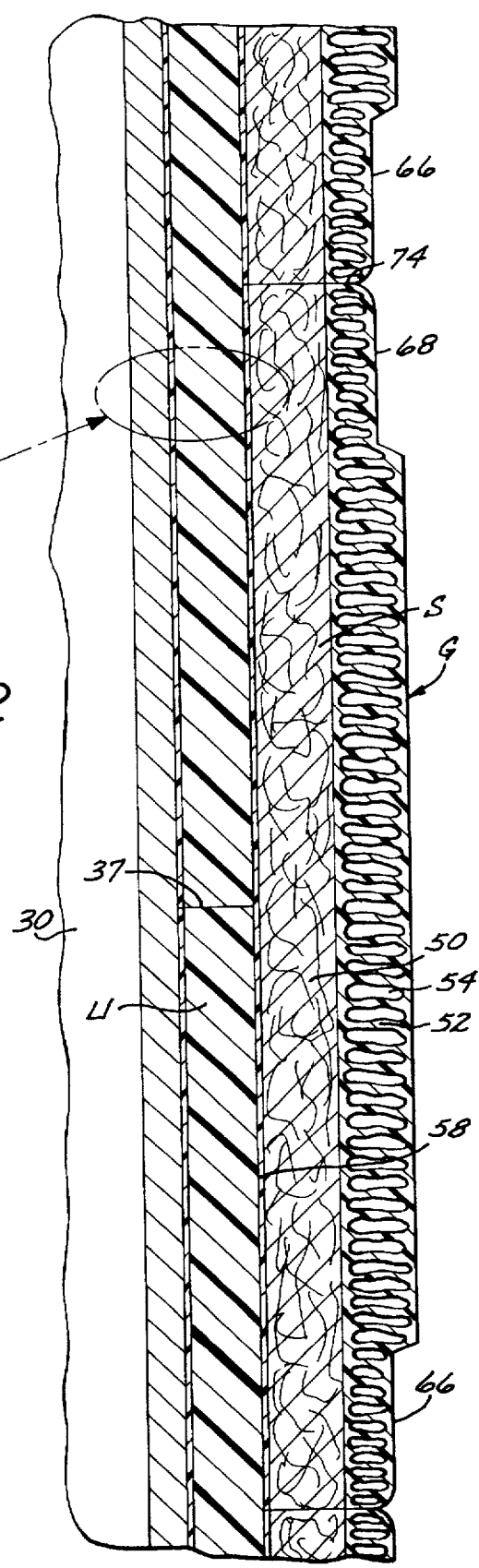
FIG. 2 is a vertical sectional view taken in enlarged scale along line 2—2 of FIG. 1.

Referring now to FIG. 10, there is shown the aforementioned elongated felt and polyurethane strip S which is spirally wrapped about the sleeve U. Resilient strip S includes a textile layer 50, such as felt. Felt layer 50 has its upper surface bonded to the polyurethane layer 52. As indicated in FIG. 2, the polyurethane layer 52 is formed with closed pores 54 which extend vertically, i.e. generally normal to the longitudinal axis of the strip S and to the golf club shaft 30 when the strip is spirally wrapped about the sleeve U. The pores 54 permit the polyurethane layer 52 to be readily compressed by the gripping force of a golfer's hands. The polyurethane layer 52 may be fabricated in a conventional manner by coating one side of a felt strip with a solution of polyurethane, e.g. polyester or polyether dissolved in a dimethyl formamide (DMF), immersing the coated strip in water baths to displace the DMF and cause the urethanes to coagulate, and finally driving off the water by the application of pressure and heat. In this manner, the closed pores 54 are formed while the underside of the polyurethane layer 52 is bonded to the upper surface of the felt layer 50. In order to form the closed pores 54, the ratio of thickness of the polyurethane layer to the thickness of the felt layer should be a minimum of about 0.18. The underside of felt layer 50 is provided with a conventional adhesive 58 which is originally covered by a protective quick-release tape 60, as shown in FIG. 11. The polyurethane layer provides a cushioned grip of the player's hands on the shaft 30 and also enhances the player's grip by providing increased tackiness between the player's hands and the grip, as compared to conventional golf club grips. The felt layer provides strength to the polyurethane layer and also serves as a means for attaching the bonded-together felt and polyurethane layer to the sleeve U.

The polyurethane layer 52 may be formed with a plurality of air passages 60. Such air passages channel perspiration or other dampness into the felt layer 50 for evaporation to further reduce slippage of the golfer's hand on the grip Referring now to FIGS. 2 and 13 the strip S is shown formed with sidewardly and outwardly extending, reinforcement, traction side edges, generally designated 66 and 68. These traction side edges may be formed by means of a heated platen (not shown) which compresses the outer portions of the side edges of the polyurethane layer below the original exterior surface dimension of the polyurethane layer. Such compression increases the strength of the polyurethane layer in the vicinity of the traction edges, prevents unraveling of the strip from the sleeve, enhances the golfer's grasp of the grip, and reduces interference with other golf clubs as a club is withdrawn from a golf bag.

To apply the strip S over the sleeve U, protective tape 60 is first peeled off the adhesive layer 58. Thereafter, the beveled upper end 70 of strip S is positioned within indentation 72 formed at the top of the sleeve below cap 38. The remainder of the strip S is then spirally wrapped about the sleeve U with the edges of the strip in tight abutment as indicated at 74 in FIG. 2. The lower portion of the strip will then be affixed to the golf club shaft by means of a conventional ferrule 76 as shown in FIG. 14.

Referring now to FIGS. 15–19, there is shown a form of a grip G embodying the present invention wherein the spirally cut sleeve S is sold in conjunction with the adhesive carrier A of FIG. 16. With this arrangement, the sleeve S is applied to the golf club shaft 30 by first adhering the adhesive carrier A in a longitudinal direction to the golf club shaft. This is accomplished by first removing the protective tape 46 from the inner surface of the plastic body 40 and then adhering the body to the golf club shaft by adhesive 42. Thereafter, the second protective tape 48 is removed from the second adhesive 44 and the main portion 36 of the spirally cut sleeve U, is spirally wrapped about the golf club shaft as indicated in FIGS. 18 and 19. Resilient strip S is thereafter wrapped spirally about the sleeve U in the manner described hereinbefore.

It should be appreciated that with the aforedescribed construction, the longitudinal gap of the present split-sleeve type grip, is completely eliminated. Instead, the main portion 36 of the sleeve U will conform to the size and curvature of either an oversized or an undersized golf club shaft. Accordingly, when the elongated strip S is spirally wrapped about the sleeve U, there is provided a smooth annular configuration of the grip.

Various modifications and changes may be made with respect to the foregoing detailed description without departing from the spirit of the present invention as set forth in the following claims.

What is claimed is:

1. A golf club grip to be positioned upon and adhered to the grip-receiving portion of a golf club shaft, said grip comprising:

a resilient sleeve having a tubular butt portion and a spirally-cut main portion integral with and depending from the butt portion;

said butt portion being telescopically received by a; upper end of the golf club shaft and the main portion being spirally wrapped about the golf club shaft below the butt portion with the edges of such main portion being in tight abutment; and an elongated strip that spirally encompasses the exterior of the sleeve with the edges of the strip being in tight abutment, the strip including a felt layer having an inner surface abutting the sleeve and a closed-pore polyurethane layer having its inner surface bonded to the outer surface of the felt layer remote from the sleeve.

2. The golf club grip of claim 1, wherein the ratio of thickness of the polyurethane layer to the thickness of the felt layer is a minimum of about 0.18.

3. The golf club grip of claim 1, wherein the polyurethane layer is formed with recessed compressed traction edges.

4. The golf club grip of claim 1, wherein the polyurethane layer has air passages to channel moisture into the felt layer for evaporation.

5. The golf club grip of claim 1, wherein the grip includes an adhesive means having a first surface adhered to the outer surface of said major portion, and a second surface provided with an adhesive that is uncovered to adhere said major portion to said golf club shaft.

6. A golf club grip to be positioned upon and adhered to the receiving portion of a golf club shaft, said grip comprising:
- a resilient sleeve having a tubular butt portion and a spirally-cut main portion integral with and depending from the butt portion;
- said butt portion being telescopically received by a; upper end of the golf club shaft and the main portion being spirally wrapped about the golf club shaft below the butt portion with the edges of such main portion being in tight abutment;
- an elongated strip that spirally encompasses the exterior of the sleeve with the edges of the strip being in tight abutment, the strip including a felt layer having an inner surface abutting the sleeve and a closed-pore polyurethane layer having its inner surface bonded to the outer surface of the felt layer remote from the sleeve; and
- an elongated adhesive carrier having a body coated on its opposite sides with first and second layers of adhesive, said layers of adhesive originally being covered by first and second protective tapes, with first said protective tape being removed to expose the first adhesive for adhering the body to the inner surface of the main portion and the second protective tape being removable to adhere the main portion to the golf club shaft.

7. The golf club grip of claim 2, wherein the polyurethane layer is formed with recessed compressed traction edges.

8. The golf club grip of claim 2, wherein the polyurethane layer has air passages to channel moisture into the felt layer for evaporation.

9. The golf club grip of claim 2, wherein the grip includes an adhesive means having a first surface adhered to the outer surface of said major portion, and a second surface provided with an adhesive that is uncovered to adhere said major portion to said golf club shaft.

10. The golf club grip of claim 2, wherein the polyurethane layer is formed with recessed compressed traction edges, and the polyurethane layer has air passages to channel moisture into the felt layer for evaporation.

11. The golf club grip of claim 10, wherein the grip includes an adhesive means having a first surface adhered to the outer surface of said major portion, and a second surface provided with an adhesive that is uncovered to adhere said major portion to said golf club shaft.

12. The golf club grip of claim 10, which further includes an elongated adhesive carrier having a body coated on its opposite sides with first and second layers of adhesive, said layers of adhesive originally being covered by first and second protective tapes, with first said protective tape being removed to expose the first adhesive for adhering the body to the inner surface of the main portion and the second protective tape being removable to adhere the main portion to the golf club shaft.

* * * * *